(12) United States Patent
Peng

(10) Patent No.: US 11,337,443 B2
(45) Date of Patent: May 24, 2022

(54) USE OF COPPER-CALCIUM SULPHATE AS ANIMAL FEED ADDITIVE

(71) Applicant: GUANGZHOU INSIGHTER BIOTECHNOLOGY CO., LTD., Guangzhou (CN)

(72) Inventor: Xianfeng Peng, Guangzhou (CN)

(73) Assignee: GUANGZHOU INSIGHTER BIOTECHNOLOGY CO., LTD., Guangzhou (CN)

( * ) Notice: Subject to any disclaimer, the term of this patent is extended or adjusted under 35 U.S.C. 154(b) by 622 days.

(21) Appl. No.: 16/071,923

(22) PCT Filed: May 12, 2016

(86) PCT No.: PCT/CN2016/081812
§ 371 (c)(1),
(2) Date: Jul. 23, 2018

(87) PCT Pub. No.: WO2017/124666
PCT Pub. Date: Jul. 27, 2017

(65) Prior Publication Data
US 2019/0021368 A1    Jan. 24, 2019

(30) Foreign Application Priority Data

Jan. 22, 2016 (CN) .......................... 201610044819.7

(51) Int. Cl.
| | | |
|---|---|---|
| *A23K 20/24* | (2016.01) | |
| *A23K 50/20* | (2016.01) | |
| *A23K 50/10* | (2016.01) | |
| *A23K 50/75* | (2016.01) | |
| *A23K 50/30* | (2016.01) | |
| *A23K 50/40* | (2016.01) | |
| *A23K 50/80* | (2016.01) | |
| *A23K 20/20* | (2016.01) | |
| *A23K 50/50* | (2016.01) | |

(52) U.S. Cl.
CPC .............. *A23K 20/24* (2016.05); *A23K 20/20* (2016.05); *A23K 20/30* (2016.05); *A23K 50/10* (2016.05); *A23K 50/20* (2016.05); *A23K 50/30* (2016.05); *A23K 50/40* (2016.05); *A23K 50/50* (2016.05); *A23K 50/75* (2016.05); *A23K 50/80* (2016.05)

(58) Field of Classification Search
CPC ........ A23K 20/20; A23K 20/24; A23K 20/30; A23K 50/10; A23K 50/20; A23K 50/30; A23K 50/40; A23K 50/50; A23K 50/75; A23K 50/80
See application file for complete search history.

(56) References Cited

U.S. PATENT DOCUMENTS

2011/0318448 A1    12/2011    Rudd et al.

FOREIGN PATENT DOCUMENTS

| | | |
|---|---|---|
| CN | 101444264 A | 6/2009 |
| CN | 101569348 A | 11/2009 |
| CN | 104336375 A | 2/2015 |
| CN | 104522421 A | 4/2015 |
| CN | 104839449 A | 8/2015 |
| CN | 105519799 A | 4/2016 |
| JP | 52117780 A | 10/1977 |

OTHER PUBLICATIONS

"Uses of Copper Compounds", 4 pages, dated Oct. 14, 2011, downloaded from https://web.archive.org/web/20141014152741/https://www.copper.org/resources/properties/compounds/copper_sulfate02.html (Year: 2011).*
Robinson et al. Aquaculture, 53 (1986) pp. 263-270 (Year: 1986).*
Clearwater et al. Comp. Biochem. & Physiol. Part C 132 (2002) pp. 269-313 (Year: 2002).*
Lucas, I., Livingstone, R., & McDonald, I. (1961). Copper sulphate as a growth stimulant for pigs: Effect of level and purity. Animal Science, 3(2), 111-119 (Year: 1961).*
Pickering, "The Chemistry of Bordeaux Mixture," J. Chem. Soc. (1907) 91:1988-2001. (Year: 1907).*
EFSA, "Scientific Opinion on the safety and efficacy of copper compounds (E4) as feed additives for all animal species", European Food Safety Authority, ESFA Journal 2012;10(12):2969. (Year: 2012).*
Beef ("Mineral and Vitamin Nutrition for Beef Cattle", The Beef Site, Sep. 6, 2008, pp. 1-17, Retrieved from Internet URL: https://www.thebeefsite.com/articles/1549/mineral-and-vitamin-nutrition-for-beef-cattle/). (Year: 2008).*

* cited by examiner

*Primary Examiner* — Stephanie A Cox
(74) *Attorney, Agent, or Firm* — Bayramoglu Law Offices L.L.C

(57) ABSTRACT

Provided is a method of using a copper-calcium sulphate as an animal feed additive. When used in animal breeding, a low dose of the copper-calcium sulphate can achieve the effect of that high dosage of copper sulphate achieve in the promotion of animal growth, and thus the copper-calcium sulphate can be used as an animal basic nutritional supplement to substitute low-copper preparations in the breeding of poultry, livestock or aquatic animals. Copper-calcium sulphate, used as a novel, efficient and safe feed additive in the feed processing industry and animal breeding industry, can reduce the dosage of copper ion by nearly 50-70% to achieve the same production performance, can significantly reduce the use of copper in animal husbandry, and can reduce the production costs, reduce the toxic side effects of a high level of copper, and reduce the environmental pollution, thus the copper-calcium sulphate is a copper compound with unique advantages.

12 Claims, No Drawings

USE OF COPPER-CALCIUM SULPHATE AS ANIMAL FEED ADDITIVE

CROSS REFERENCE TO RELATED APPLICATIONS

This application is the national phase entry of International Application No. PCT/CN2016/081812, filed on May 12, 2016, which is based upon and claims priority to Chinese Application No. 201610044819.7, filed on Jan. 22, 2016, the entire contents of which are incorporated herein by reference.

TECHNICAL FIELD

The present invention relates to the field of animal feed additives, particularly to the use of copper-calcium sulphate as an animal feed additive, and more particularly to the use of copper-calcium sulphate as an animal basic nutritional supplement in substituting low-copper preparations and as an animal growth promoter in substituting high-copper preparations.

BACKGROUND

Copper, being one of the essential trace elements for animal, is involved in activities such as hematopoiesis, metabolism, growth, and disease resistance. The nutritional requirement of copper in animals is 5 to 8 mg/kg. A high dose of copper, up to 250 mg/kg, has a growth promoting effect on animals, which was first discovered in pigs in 1955 and later in growing chickens and laying hens.

As a heavy metal element, copper has a strong effect in coagulating proteins. A high dose of copper can be used in mildew prevention on animal feeds and in gut sterilization, and of course leads to a microbial imbalance in animals' guts causing diarrhea and vitamin B deficiencies. Though a high dose of copper has antimicrobial and growth promoting effects, a long-term high-copper intake will lead to four side effects. (1) The first aspect is the poisonous effects of high-copper intake on animals. A high-copper intake will damage animals' organs. 200 ppm of copper will lead to cellular swelling of liver, granular degeneration of cytoplasm, glomerular enlargement, renal tubule swelling, protein exudation in the glomerular capsule, granular degeneration of cardiac muscle fibers, decrease of splenic lymphocytes, and proliferation of smooth muscle fibers. When accumulating to a certain amount in the liver of an adult animal, copper will be released into the blood and cause erythrocytolysis, which leads to jaundice and tissue necrosis, resulting in growth inhibition and deaths. Via experiments, it is found that the proportion of dermatitis and nephropathy syndrome in weanling piglets with high-copper intake is over 5% higher than those with low-copper intake, indicating that a high-copper intake may be one of the causes of porcine dermatitis and nephropathy syndrome and can weaken pig's immunity. (2) Use of high-copper feed can affect food safety. A long-term high-copper intake can lead to an excessive residue in animal tissues and organs, affecting food safety. (3) A high-copper intake can interfere with the absorption of other nutrients. (4) Use of high-copper feed also causes serious environmental pollution.

Therefore, development of modern husbandry is in need of a novel, efficient and safe substitute for high-copper preparations used in feeds (while a low dose of copper compounds is still effective).

SUMMARY

One object of the present invention is to provide the use of copper-calcium sulphate as a novel and efficient animal feed additive (as well as the use in preparing animal feed additives).

Copper-calcium sulphate is a broad-spectrum, protective and mineral-based complexed copper fungicide, regarded as the commercial production "Bordeaux powder", is used as a substitute for the traditional Bordeaux liquid in the control of fungal and bacterial diseases on fruits, vegetables and several other industrial crops.

The compound involved in the present invention, copper-calcium sulphate, is a prior art compound having a structural formula as $CuSO_4 \cdot 3Cu(OH)_2 \cdot 3CaSO_4 \cdot nH_2O$ (n=0.3 to 5).

The use mentioned above refers to the use of copper-calcium sulphate as an animal basic nutritional supplement or an animal growth promoter (as well as the use of copper-calcium sulphate in preparing an animal basic nutritional supplement or an animal growth promoter).

Via experiments the inventor found that, within the range of nutritional need for copper, i.e. 1 to 30 ppm, copper-calcium sulphate (calculated based on copper ion, the same below) can significantly promote animal growth. With a low dose intake of copper, copper-calcium sulphate showed a growth promoting effect equal to that of a high-copper intake with copper sulfate pentahydrate as the additive. Therefore, copper-calcium sulphate can be used as a feed additive in feed industry.

On one hand, when the above-mentioned copper-calcium sulphate is used as a feed additive within the range of animal nutritional need for copper, i.e. 1 to 30 ppm, addition of copper-calcium sulphate, in the required dose into animal dietary feeds as a low-copper preparation, can meet the basic nutritional need of animals and remedy the copper deficiency of feeds which is due to high level addition of other nutrients such as calcium, molybdenum, ferrum and sulphur or presence of strong oxidants.

Further, the above-mentioned copper-calcium sulphate is a unique macromolecular complex of copper and calcium and can release bactericidal copper ions when exposed to water or aqueous membranes; and since germs can only induce infection when exposed to water or aqueous membranes, the two processes are synchronous. Therefore it has an anti-mildew effect on feeds during processing and storage of the feeds.

On the other hand, when the mentioned copper-calcium sulphate is used as a feed additive in animal husbandry, a low dose of copper-calcium sulphate shows a growth promoting effect on animal identical to that of a high dose of copper sulphate. The high dose of copper sulphate for animal growth promotion requires a dose of 150 to 250 ppm or higher than 250 ppm, which exceeds 200 ppm, the highest allowable concentration of copper element specified by current feed processing standards, and thereby reaches the toxicity upper limit of long-term copper intake for animal.

As a unique macromolecular complex of copper and calcium, copper-calcium sulphate releases copper ions slowly and persistently when exposed to digestive juice in digestive tracts, avoiding copper poisoning caused by high copper level in internal digestive system. While copper ions have a bactericidal effect, normal flora in animal digestive tracts can be maintained under low level of copper, such that animal health is maintained. Meanwhile, copper-calcium sulphate comprises a certain amount of mineral calcium, providing partial calcium substance for nutritional requirements during feed processing.

The above mentioned copper-calcium sulphate as a feed additive can be applied to animals including farmed animals such as poultry, livestock or aquatic animals.

Said poultry includes chickens, turkeys, guinea fowls, ducks, geese, pigeons and quails in all growth stages.

Said livestock includes pigs, cattle, sheep, horses, rabbits, dogs, cats and donkeys in all growth stages.

Said aquatic animals include farmed aquatic animals such as shrimps, fishes, eels and crabs.

In the present invention, a concentration of copper-calcium sulphate in feed is 1 to 250 ppm, and preferably 10 to 200 ppm.

Said feed is a typical annual diet such as a complete formula feed, a concentrated feed or a premix.

The use of copper-calcium sulphate of the present invention in animal feeds can reduce the dosage of copper ion by nearly 50% to 70% while maintaining the production, and thereby the copper amount used in husbandry is decreased, so as to reduce the cost, the poisonous effects and the pollution, making it a promising copper compound.

DETAILED DESCRIPTION OF THE EMBODIMENTS

The following embodiments are explanation for the present invention, but not used for limiting the present invention.

Sources of the samples are listed in Tab. 1.

TABLE 1

Source of the samples used in the embodiment

| Sample | Quality | Producer |
|---|---|---|
| Copper-calcium sulphate | Purity of 98% | Guangzhou Insighter Biotechnology Co., Ltd |
| Copper sulfate pentahydrate | Feed grade | Zhuzhou Xinxiang Feed Additive Co., Ltd. |
| Copper chloride hydroxide | Feed grade | Zhengzhou Yifa Chemical Product Co., Ltd. |
| Calcium sulphate | Feed grade | Jingmen Leixin Gypsum Product Co., Ltd. |

Embodiment 1

Application Effects of Copper-Calcium Sulphate of Various Concentrations in Piglet Feed 160 52-day-aged Duroc×Landrace×Large White piglets similar in weight were divided into twelve groups after leaving the nursery, 20 piglets in each group as shown in Tab. 2. The piglets were given ad libitum access to feed and water, wherein each group was provided with complete formula feed without high-copper level in combination with different kinds or concentrations of copper compounds. Weight gains and feed conversions for each group were recorded during a 28-day experiment. Results are as shown in Tab. 2. As can be seen from Tab. 2, the addition of copper-calcium sulphate in feed (calculated based on copper content, the same below) can improve the weight gains and the feed conversion ratios, wherein the improvements of production are positively correlated with the concentration, and 100 ppm of copper-calcium sulphate shows improvements similar to those of 200 ppm of copper sulphate.

TABLE 2

Growth promoting effects of different concentrations of copper-calcium sulphate on piglets

| Group | Number of animals | Additive | Concentration (ppm) | Average daily weight gain (g) | Average feed conversion ratio |
|---|---|---|---|---|---|
| 1 | 20 | — | — | 460 | 2.109 |
| 2 | 20 | Copper chloride hydroxide | 30 | 467 | 2.076 |
| 3 | 20 | Copper chloride hydroxide | 200 | 485 | 2.055 |
| 4 | 20 | Copper sulfate pentahydrate | 30 | 465 | 2.085 |
| 5 | 20 | Copper sulfate pentahydrate | 200 | 477 | 2.045 |
| 6 | 20 | Copper-calcium sulphate | 10 | 462 | 2.111 |
| 7 | 20 | Copper-calcium sulphate | 20 | 471 | 2.128 |
| 8 | 20 | Copper-calcium sulphate | 30 | 473 | 2.078 |
| 9 | 20 | Copper-calcium sulphate | 100 | 478 | 2.041 |
| 10 | 20 | Copper-calcium sulphate | 200 | 495 | 2.012 |
| 11 | 20 | Calcium sulphate | 150 | 461 | 2.116 |
| 12 | 20 | Copper sulfate pentahydrate + calcium sulphate | 200 + 150 | 478 | 2.046 |

Note:
The concentrations of copper additives are calculated based on copper ion; the concentrations of calcium sulphate are calculated based on calcium ion; group 1 served as a control blank without any additive; the feed of group 12 was added with a mixture of copper sulfate pentahydrate and calcium sulphate in the specified concentrations.

Embodiment 2

Application Effects of Copper-Calcium Sulphate in Feed for Grower Pigs 80 83-day-aged Duroc×Landrace×Large White pigs similar in weight were divided into four groups as shown in Tab. 3, 20 pigs in each group. The pigs were given ad libitum access to feed and water, wherein each group was provided with complete formula feed without high-copper level in combination with different kinds or concentrations of copper compounds. Weight gains and feed conversions for each group were recorded during a 28-day experiment. Results are as shown in Tab. 3. As can be seen from Tab. 3, an addition of 15 ppm of copper-calcium sulphate showed improvements of production on the pigs significantly higher than those of copper sulphate and copper chloride hydroxide in the same concentration, and similar to those of 150 ppm of copper sulphate. Moreover, the 150 ppm of copper-calcium sulphate (calculated based on copper content, the same below) showed a production greatly better than that of 150 ppm of copper sulphate.

TABLE 3

Application effects of copper-calcium sulphate in feed for grower pigs

| Group | Number of animals | Additive | Concentration (ppm) | Average daily weight gain (g) | Feed conversion ratio |
|---|---|---|---|---|---|
| 1 | 20 | Control blank | — | 568 | 2.402 |
| 2 | 20 | Copper chloride hydroxide | 150 | 587 | 2.324 |

TABLE 3-continued

Application effects of copper-calcium
sulphate in feed for grower pigs

| Group | Number of animals | Additive | Concentration (ppm) | Average daily weight gain (g) | Feed conversion ratio |
|---|---|---|---|---|---|
| 3 | 20 | Copper sulfate pentahydrate | 150 | 583 | 2.340 |
| 4 | 20 | Copper-calcium sulphate | 150 | 598 | 2.281 |

Note:
The concentrations of copper additives are calculated based on copper ion; the control blank group was provided without any copper additive.

Embodiment 3

Application Effects of Copper-Calcium Sulphate in Broiler Feed 700 1-day-aged fast-growing yellow feather broilers (female) were divided according to Tab. 4, 100 broilers in each group. The broilers were given ad libitum access to feed and water, wherein each group was provided with complete formula feed without high-copper level in combination with different kinds or concentrations of copper compounds. Weight gains and feed conversions for each group were recorded during a 21-day experiment. Results are as shown in Tab. 4. As can be seen from Tab. 4, the addition of 10 to 40 ppm of copper-calcium sulphate (calculated based on copper content, the same below) can significantly improve the weight gains and the feed conversion ratios, wherein the improvements of production are concentration-dependent, and 30 ppm of copper-calcium sulphate shows improvements on broilers similar to those of 110 ppm of copper sulphate pentahydrate.

TABLE 4

Growth promoting effects of different concentrations
of copper-calcium sulphate on broilers

| Group | Number of animals | Additive | Concentration (ppm) | Average daily weight gain (g) | Feed conversion ratio |
|---|---|---|---|---|---|
| 1 | 100 | Copper sulfate pentahydrate | 10 | 18.6 | 1.932 |
| 2 | 100 | Copper sulfate pentahydrate | 60 | 19.2 | 1.872 |
| 3 | 100 | Copper sulfate pentahydrate | 110 | 23.4 | 1.736 |
| 4 | 100 | Copper-calcium sulphate | 10 | 19.1 | 1.766 |
| 5 | 100 | Copper-calcium sulphate | 20 | 22.8 | 1.716 |
| 6 | 100 | Copper-calcium sulphate | 30 | 24.2 | 1.715 |
| 7 | 100 | Copper-calcium sulphate | 40 | 25.1 | 1.708 |

Note:
The concentrations of copper additives are calculated based on copper ion.

Embodiment 4

Application of Copper-Calcium Sulphate in Aquatic Animal Feed (1) Test Materials Test fishes: The fishes used in this embodiment were underyearling black carps, provided by Dafeng Breeding Farm in Huizhou City, Guangdong Province. The healthy and lively fishes, which were identical in size, had been bred in big net cages ($4\times2\times1.5$ m$^3$) for 4 weeks prior to experiment. The experiment was conducted with small floating net cages ($1.1\times1.1\times1.1$ m$^3$), and each net cage was provided with an aerator and aerated 24 hours every day. The small net cages were arranged in a 3500 m$^2$ pond along with temporary rearing net cages. The water depth in the pond was about 1.5 meters, and the water in the pond is fully aerated from the bottom. During the test, 336 black carps which had been fasted for 1 day were randomly divided into seven groups, four duplicates for each group, and twelve fishes for each duplicate. The fishes were weighed as a whole before they were randomly assigned into 28 net cages and respectively fed with different test feeds.

Test feeds: The test feeds were prepared according to Tab. 5, and added with different concentrations of copper preparations (calculated based on copper ion) according to Tab. 6 respectively for different group. After super-finely crushed, all feed materials were made into floating expanded pellet feeds with a particle size of 3 mm by a pellet-fodder expander provided by Jiangsu Muyang Company with a production temperature of 130° C., and then coated with 3% soybean oil by an oil spraying device. The feeds were then sealed and preserved for later use.

TABLE 5

Feed formula and ingredients (% wt.)

| Material | Content (%) | Material | Content (%) |
|---|---|---|---|
| Fish meal | 9.0 | Soybean oil | 3.0 |
| Casing powder | 3.0 | Phospholipid rapeseed meal | 9.0 |
| Bean pulp | 12.0 | Wheat gluten | 4.0 |
| Rapeseed meal | 12.0 | Blood cell meal | 2.0 |
| Monosodium glutamate protein | 3.0 | Vc- phosphate ester | 0.1 |
| Wheat middlings | 12.6 | Calcium dihydrogen phosphate | 1.8 |
| Flour | 17.0 | Choline chloride | 0.2 |
| Bentonite | 0.70 | Multivitamins | 0.1 |

(2) Test Method

Test management: Ration restriction was adopted and the ration was adjusted weekly. The feeding level was identical between the groups (based on the initial weights). The fishes were fed twice (7:30 and 15:00) every day for 8 weeks. During the test, the water quality was monitored regularly, maintaining a water temperature of 26.88±3.08° C., a dissolved oxygen value of more than 5.0 mg O L$^{-1}$, a pH value of 7.8, an ammoniacal nitrogen value of less than 0.5 mg N L$^{-1}$, and a nitrite nitrogen value of less than 0.05 mg N L$^{-1}$.

Parameters recording and calculating: During the test, the fishes in each net cage were weighed as a whole after fasted for 1 day, and the average weight gains (g) and feed conversion ratios were calculated, according to the following formulars.

Average weight gain (g)=average final weight−average initial weight

Feed conversion ratio=feed intake/fish weight gain (3) Test Result

Test result of growth promoting effects of copper-calcium sulphate on fish is as shown in Tab. 6. The result shows that, an addition of 15 to 60 ppm of copper-calcium sulphate (calculated based on copper content, the same below) can significantly improve the daily weight gains and feed conversion ratios of the test fishes, and the production improvements are apparently concentration-dependent. 30 ppm of copper-calcium sulphate can achieve production improvements on the fishes similar to those of 60 ppm of copper sulfate pentahydrate.

TABLE 6

Application effects of different concentrations of copper-calcium sulphate in aquatic animal feed

| Group | Number of animals | Additive | Concentration (ppm) | Average daily weight gain (g) | Feed conversion ratio |
|---|---|---|---|---|---|
| 1 | 48 | Control | — | 335 | 1.490 |
| 2 | 48 | Copper sulfate pentahydrate | 15 | 347 | 1.438 |
| 3 | 48 | Copper sulfate pentahydrate | 30 | 350 | 1.426 |
| 4 | 48 | Copper sulfate pentahydrate | 60 | 360 | 1.386 |
| 5 | 48 | Copper-calcium sulphate | 15 | 350 | 1.426 |
| 6 | 48 | Copper-calcium sulphate | 30 | 364 | 1.371 |
| 7 | 48 | Copper-calcium sulphate | 60 | 372 | 1.342 |

Note:
The concentrations of copper additives are calculated based on copper ion; the control blank group was provided without any copper additive.

The above embodiments are preferred embodiments but not to limit the present invention. Any other amendment, modification, replacement, combination or simplification that based on the principal of the present invention shall be regarded as an equivalent embodiment and thereby fall within the scope of the present invention.

What is claimed is:

1. A method of using copper-calcium sulphate as an animal feed additive, comprising a step of adding the copper-calcium sulphate to animal feed,
wherein a concentration of the copper-calcium sulphate in the animal feed is 10 to 200 ppm calculated based on copper ion content.

2. The method according to claim 1, wherein the copper-calcium sulphate is used as an animal basic nutritional supplement or an animal growth promoter.

3. The method according to claim 2, wherein the copper-calcium sulphate is used as the animal basic nutritional supplement to remedy copper deficiency.

4. The method according to claim 2, wherein the copper-calcium sulphate is used as the animal growth promoter as a substitute for copper sulphate.

5. The method according to claim 2, wherein the animal feed is for poultry, livestock or aquatic animal.

6. The method according to claim 5, wherein the poultry is a chicken, turkey, guinea fowl, duck, goose, pigeon or quail in all growth stages.

7. The method according to claim 5, wherein the livestock is a pig, cattle, sheep, horse, rabbit, dog, cat or donkey in all growth stages.

8. The method according to claim 5, wherein the aquatic animal is a fish, shrimp or crab.

9. The method according to claim 1, wherein the animal feed is for poultry, livestock or aquatic animal.

10. The method according to claim 9, wherein the poultry is a chicken, turkey, guinea fowl, duck, goose, pigeon or quail in all growth stages.

11. The method according to claim 9, wherein the livestock is a pig, cattle, sheep, horse, rabbit, dog, cat or donkey in all growth stages.

12. The method according to claim 9, wherein the aquatic animal is a fish, shrimp or crab.

* * * * *